Patented May 12, 1942

2,282,803

UNITED STATES PATENT OFFICE 2,282,803

STABILIZED HEAT REACTED CEREAL FLAKES

Sidney Musher, New York, N. Y., assignor to Musher Foundation Incorporated, New York, N. Y., a corporation of New York No Drawing. Application April 22, 1940, Serial No. 330,984

5 Claims. (Cl. 99—153)

The present invention relates to a method for producing substantially stabilized heat reacted oat flakes that may readily be marketed without special packaging.

In the normal milling of oats, it has been found very difficult to remove the oat polish and oat germ both of which are high in fat content. Moreover, the oats themselves are quite high in fat content and the oats containing the germ present a definite problem from the standpoint of keeping quality when they are put into dried flake form, being readily subject to the development of cardboard odors and flavors and to rancidity.

An object of the present invention is therefore to produce oat flakes which will be substantially resistant to the development of rancidity and oxidative deterioration.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, the oats are first cleaned to remove foreign material such as weed seeds, dust, etc. The oats are then heated to over about 180° F. for approximately 1 hour until the moisture content is reduced from about 12% to about 7%.

The hulls are then removed by passing the oats between stones operated at different speeds or in which the upper stone revolves against a lower stationary stone. The oat groats freed of hulls may then be utilized in accordance with the present invention or preferably are subjected to a grinding or milling process whereby the particle size of the groats is reduced to at least about 25 mesh and preferably to 50 mesh or more.

These dehulled oats, preferably in finely divided or oat flour form are mixed with from 1 to 5 parts of water and heated to over 180° F. and preferably to 200° F. to 210° F. or more. To this heated mass is added a relatively small proportion of concentrated milk-solids-not-fat, preferably concentrated caramelized whey, followed by flaking and drying at 375° F. to 625° F.

The whey that is particularly utilized in accordance with the present invention is obtained from the manufacture of cheese and is the material drawn off after the milk has been curdled with rennet, for example, and after the curd has formed the proper degree of hardness. Of particular importance for use in the whey that is obtained from the manufacture of cottage cheese, whereby coagulation is effected by natural souring and the liquid has been heated nearly to boiling. The whey may further be treated in order to remove a portion of the lactose, the lactose being allowed to crystallize out.

The whey is substantially free of casein and of fat and will contain about 70% to 75% of lactose and 10% to 15% protein, the protein being substantially free of casein and being present in the form of milk albumin.

Where a portion of the lactose has been allowed to crystallize out, the whey will contain about 35% to 45% protein in the form of albumin and about 40% to 55% of lactose with approximately 13% to 17% total ash, based upon the solids weight of the whey.

Apparently in the production of the whey, antioxygenic action is materially enhanced and it appears as if the lactose is not responsible for the antioxygenic effect in view of the fact that the lactose content may be reduced by from 25% to 40% and at the same time obtaining an enhanced stabilizing effect.

Moreover, it has been found of particular desirability to subject the whey in aqueous dispersion to a temperature of at least about 220° F. and preferably to 235° F. to 245° F. for about 15 to 30 minutes or more at some stage in its processing whereby the whey is caramelized. The caramelization process further enhances the protective effect of the whey and unless the whey has been subjected to this caramelization step, the most desirable results of the present invention are not secured.

For example, from about 1% to about 25% and preferably about 5% of concentrated whey is added to the heated water containing the oats and in the first dehydration step, a reaction appears to occur between the whey and the oats so that when the heated oats containing the whey are formed in ribbons or shreds to form flakes and further and completely dehydrated at a temperature between about 375° F. and 625° F., the oat flakes will be substantially stabilized against oxidative deterioration.

In addition to using concentrated whey, preferably in caramelized condition, other milk-solids-not-fat may also be employed including particularly concentrated buttermilk where at least a portion of the lactose has been converted to lactic acid.

Among the other forms of milk-solids-not-fat that may be utilized are included evaporated buttermilk containing about 25% to 30% total solids, condensed or semi solid buttermilk containing about 35% to 45% total solids, dried buttermilk, skim milk in concentrated or dried form, whole milk and whey residue.

These various milk solids are preferably caramelized before being utilized in accordance with the present invention, such caramelization having been done by heating the milk solids to between 235° F. and 245° F. for 15 to 30 minutes or more and desirably for as long as 1 hour.

The milk solids such as the whey are desirably employed in concentrated or condensed form having at least about 20% to 25% total solids. Following caramelization of the milk solids, they may where desired be completely dried and added in dried condition to the heated aqueous dispersion containing the oats.

Where the whey or other milk solids are added to the heated oats and this heat treatment is conducted at a temperature as high as about 200° F. to 210° F. and preferably to as high as 235° F. to 245° F., caramelization of the milk solids before being added to the heated oats is not as important. It is preferable, however, for the milk solids to first have been caramelized before being added to the heated oats as an enhanced stabilizing action will then be observed.

Where the milk solids are too concentrated or too viscous to secure complete dispersion of the whey in the heated oat suspension, water or skim milk may be added until the proper dilution has been obtained.

For example, 1 part of dehulled oats by weight may be heated with 1 to 3 parts by weight of water containing from 5% to 20% of whey or similar milk-solids-not-fat. The heating is continued preferably at a temperature of between 200° F. and 210° F. to obtain the first stage of stabilization and also to begin dehydration. The heated mixture of oats in the aqueous dispersion of milk solids is then prepared for flaking by running out on a conveyor in ribbons or shreds.

After the heated oats containing the whey are partially dehydrated, they may be completely dried by flaking and subjecting to a temperature between 375° F. and 625° F. until completely dried.

It has surprisingly been found that even where the oats that are utilized in accordance with the present invention are substantially off-flavored, off-odored or rancid before treatment, nevertheless by the use of the whey in accordance with the present invention, the finished dried oat flakes are substantially stabilized against oxidative deterioration and, at the same time, do not show any noticeable off-flavor or off-odor. This is particularly surprising in view of the fact that when off-flavored or off-odored oats are employed, the off-flavor and off-odor are particularly noticeable during the first heating, but after the finished product has been flaked and subjected to the 375° F. to 625° F. final drying, this off-odor and off-flavor has entirely disappeared.

As a very much less preferable alternative, the whey in aqueous dispersion may be sprayed on the surface of the ribbons or the flakes of the oats after the preliminary heat treatment has been completed and before subjecting to the final drying, at 375° F. to 625° F.

In the final drying in flaked form, unless the oats are subjected to as high a temperature as between about 375° F. and 625° F., the fully desirable results of the present invention are not obtained. If, for example, the final drying is permitted to proceed at lower temperatures and under reduced pressure, the desired stabilization is not secured.

Together with or in lieu of the dehulled oats, other dehulled whole cereals may similarly be prepared in flaked form and particularly whole wheat, whole corn and whole rice, containing their original germ and polish.

Less desirably, the germinated or sprouted oats may be employed for utilization in accordance with this invention.

It has been found particularly desirable for the combination of the oat germ and milk solids in aqueous dispersion to be adjusted to pH between about 4 and 6.8 and desirably to pH of 5.5 to 6 before subjecting to the preliminary heat treatment. It is also desirable for this pH to be retained at the time that the final product is flaked at 375° F. to 625° F. and the pH adjustment is beneficial in producing the fully desirable stabilizing results of the present invention. The pH adjustment may be made by the addition of citric, lactic, tartaric, malic, hydrochloric, phosphoric or acetic acids.

Although it is not clear as to exactly what causes the antioxygenic effect and the improvement in the oat flakes, it appears that upon the heat treatment, the oat flakes tend to exude an oily material consisting largely of oat oil which tends to form a continuous or discontinuous surfacing upon the oat flakes. The milk-solids-not-fat or the whey, particularly when in caramelized condition, tend chemically to combine or otherwise form a substantially permanent combination with such exuded oil which acts as a surfacing for the oat flakes to protect them against oxidative deterioration for relatively long periods of time. At the same time this coating places the oat flakes in better edible condition and makes them more digestible.

There may, where desired, be included in the oat milk solids aqueous combination at the time of the first heat treatment to about 200° F. to 210° F. a relatively small amount of a sugar.

The oats or other cereal may be subjected to a "puffing" operation before being utilized in accordance with the present invention.

For example, oats may be placed into a "puffing gun" which is heated to about 300° F. to 600° F. and into which steam is introduced so that the internal pressure reaches 40 pounds to 200 pounds or more per square inch. After a period of about 5 seconds to several minutes, the pressure may be released and the oats discharged.

Together with or in lieu of the milk solids, and particularly whey, there may be employed the alcohol soluble extracts of these milk solids. For example, an extract of concentrated and preferably dried whey or other milk solids may be made by the use of methyl alcohol, ethyl alcohol, butyl alcohol or propyl alcohol in order to produce an alcohol soluble extract and which extract, after removal of the solvent therefrom, may readily be employed together with or in lieu of the whey or other milk solids in accordance with the present invention.

Together with or in lieu of the milk solids, there may also be employed brewer's yeast and baker's yeast and particularly the water soluble extracts of the yeast. The slightly acidified water soluble extract of yeast, when applied to the oats before flaking and drying develops marked antioxygenic activity and assures better retention of the original flavor and aroma of the oats.

Unless the yeast or its water extract is applied to the oats while at the elevated temperature, the desired antioxygenic effect is not obtained.

The present application is a continuation in part of applications, Serial No. 301,758 filed October 28, 1939, now Patent No. 2,198,205, Serial No. 239,319 filed November 7, 1938, now Patent No. 2,198,215 and Serial No. 317,175 filed February 3, 1940, now Patent No. 2,198,218.

Having described my invention, what I claim is:

1. A method of producing stabilized, dried, cereal flaked products which comprises adding to a cereal in aqueous dispersion a relatively small proportion of caramelized milk-solids-not-fat, heating to over 180° F., running out the cereal product containing the milk-solids-not-fat in flaked form, and then drying the flaked cereal product containing the milk-solids-not-fat at a temperature between 375° F. and 625° F.; said cereal being selected from the group consisting of oats, wheat, corn and rice, said cereal flaked products being substantially stabilized against oxidative deterioration.

2. A method of producing stabilized, dried oat flaked products which comprises adding to dehulled oats in aqueous dispersion a relatively small proportion of concentrated, caramelized milk-solids-not-fat, heating to over 180° F., running out the oat product containing the milk-solids-not-fat in flaked form, and then drying the flaked oat product containing the milk-solids-not-fat at a temperature between 375° F. and 625° F., said oat flaked product being substantially stabilized against oxidative deterioration.

3. A method of producing stabilized dried oat flaked products which comprises adding to dehulled oats in aqueous dispersion a relatively small proportion of caramelized whey, heating to over 180° F., running out the oat product containing the caramelized whey in flaked form, and then drying the flaked oat product containing the caramelized whey at a temperature between 375° F. and 625° F., said oat flaked product being substantially stabilized against oxidative deterioration.

4. A method of producing stabilized dried cereal flaked products which comprises mixing cereals with from 1 to 5 parts of water containing a relatively small proportion of caramelized milk-solids-not-fat, heating to over 180° F., running out the cereal product containing the milk-solids-not-fat in flaked form, and then drying the flaked cereal product containing the milk-solids-not-fat at a temperature between 375° F. and 625° F., said cereal being selected from the group consisting of oats, wheat, corn and rice, said cereal flaked products being substantially stabilized against oxidative deterioration.

5. A method of producing stabilized dried cereal flaked products which comprises mixing cereals with from 1 to 5 parts of water at a pH of 4 to 6.8, said water containing a relatively small proportion of caramelized milk-solids-not-fat, heating to over 180° F., running out the cereal product containing the milk-solids-not-fat in flaked form, and then drying the flaked cereal product containing the milk-solids-not-fat at a temperature between 375° F. and 625° F., said cereal being selected from the group consisting of oats, wheat, corn and rice, said cereal flaked products being substantially stabilized against oxidative deterioration.

SIDNEY MUSHER.